G. MUNGER,

Assignor, by mesne assignments, to A. H. ANDREWS & Co.

School-Desk and Seat.

No. 8,605. Reissued Mar. 4, 1879.

Inventor:

George Munger
Per West & Bond
Attorneys.

Witnesses:

H. L. Bruns.
E. T. Bond

N. PETERS, PHOTO-LITHOGRAPHER, WASHINGTON, D. C.

UNITED STATES PATENT OFFICE.

GEORGE MUNGER, OF MADISON, CONNECTICUT, ASSIGNOR, BY MESNE ASSIGNMENTS, TO A. H. ANDREWS & CO., OF CHICAGO, ILLINOIS.

IMPROVEMENT IN SCHOOL DESKS AND SEATS.

Specification forming part of Letters Patent No. 57,824, dated September 4, 1866; Reissue No. 8,605, dated March 4, 1879; application filed June 24, 1878.

*To all whom it may concern:*

Be it known that I, GEORGE MUNGER, now of Madison, New Haven county, State of Connecticut, formerly of New York, N. Y., have invented a new and Improved School Desk and Seat; and I do hereby declare that the following is a full, clear, and exact description thereof, which will enable others skilled in the art to make and use the same, reference being had to the accompanying drawings, forming part of this specification, in which—

Figure 1:
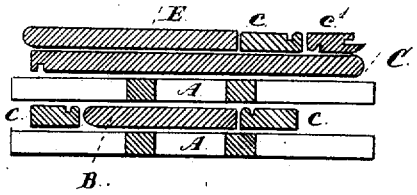
Figure 2:
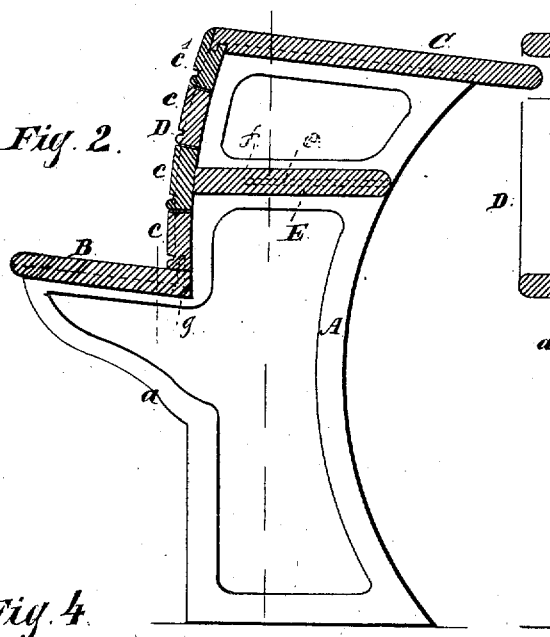
Figure 3:
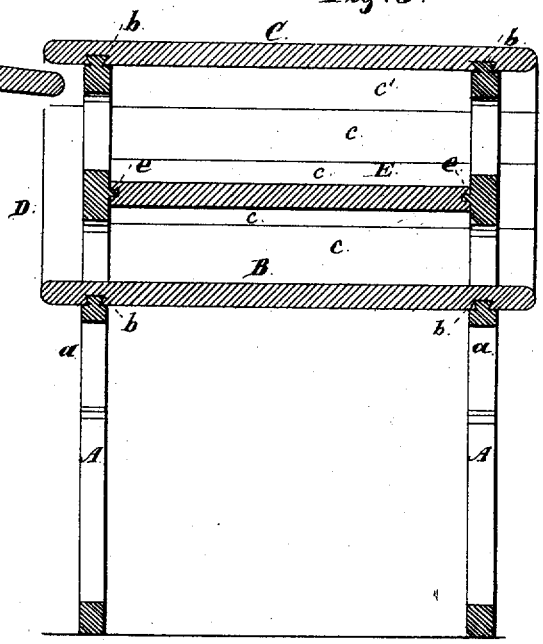
Figure 4:
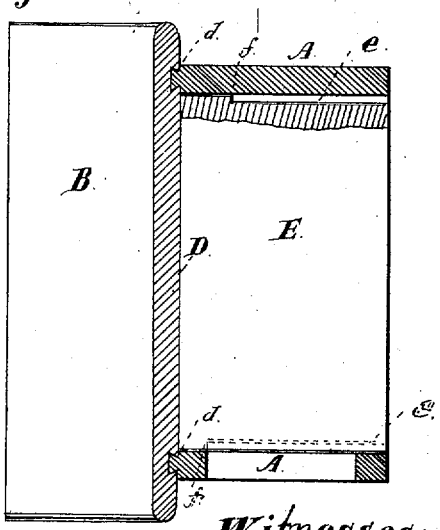
Figure 5:
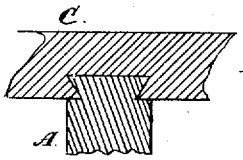

Figure 1 represents a transverse section of a school-desk constructed according to this invention when taken apart and put up ready for shipping; Fig. 2, a transverse section of the same when put up for use. Fig. 3 is a longitudinal vertical section of the same. Fig. 4 is a sectional plan or top view of the same.

Similar letters of reference indicate like parts.

This invention relates to school desks and seats, and to settees of that class generally used in schools.

The chief object of this invention is to so construct such desks and seats or settees that the several pieces of which they are composed can be readily packed in a comparatively small compass, and when wanted for use can be securely put together with little labor and expense, and this I accomplish by joining and holding the several pieces together by means of dovetail tongues and grooves, as hereinafter fully set forth.

In the drawings, A A represent two standards, which are made of cast-iron or any other suitable material, in the form or shape required for the article to be produced. For a school desk and seat said standards are provided with two arms or brackets, *a a*, which are intended to support the seat B; and the top edges of the standards, as well as the top edges of the brackets *a a*, are provided with dovetailed tongues *b*, to fit into corresponding grooves in the under surfaces of the seat B and of the top C, as shown particularly in Fig. 3.

The back D is composed of a series of narrow strips, *c*, which are provided with dovetailed grooves *d*, to catch over corresponding tongues projecting from the proper edges of the standards A. These edges are curved so as to give to the back a comfortable shape, and it is therefore necessary to take for the back a number of strips, so that the same can adapt themselves to the curved edges.

The upper strip, *c'*, is provided with a square groove in its top edge, (see Fig. 2,) and this groove corresponds to a tongue on the under surface of the top C, so that by pushing said strip up after the top is in its place the groove of the strip will engage with the tongue of the top, and said top be securely held in position.

Under the top, and at a suitable distance from the same, is the shelf E, which is supported by ribs or tongues *e*, cast or otherwise attached to the inner surfaces of the standards A. These tongues engage with corresponding grooves in the ends of the shelf, and said grooves are provided with stops *f*, (see Fig. 4,) so that when the shelves are introduced from the front and the strips composing the back are in place, said shelves cannot be pushed out in either direction, the stops *f* retaining them in one and the back D in the opposite direction.

The seat B may be held in place by a screw, *g*, passing up through it, and screwing into the bottom edge of the back D.

It is obvious that the same construction is applicable to a simple settee without the desk or top C and shelf E, and in this case the form only of the standards will be changed; but the seat and back will be secured in their places in the same or a similar manner as above described.

If desired, the seat may also be made in sections, and curved to render it more convenient for the person using it than it is when made flat.

By these means a school desk and seat or a settee is obtained which can be easily packed in a small compass for shipping, and which, when arrived at its place of destination, can be easily put up in a short time, and without requiring any peculiar mechanical skill, which is of great importance in shipping furniture to schools in the country, and places where mechanical labor is scarce and difficult to be had.

What I claim as new, and desire to secure by Letters Patent, is—

1. The standards A, having their bearing-edges provided with dovetail tongues, substantially as and for the purpose set forth.

2. The standards A, having their bearing-edges provided with dovetail tongues, in combination with cross boards or slats provided with corresponding grooves, substantially as and for the purpose specified.

3. As an article of manufacture, a desk consisting of the standards A, brackets *a*, both having their top edges dovetailed, grooved seat B, grooved top C, grooved back-strips *c*, and grooved shelf E, with stops *f*, constructed and combined as and for the purpose specified.

GEO. MUNGER.

Witnesses:
HENRY L. SMITH,
FRANK G. JOHNSON.